US012558876B2

(12) United States Patent
Miyazawa et al.

(10) Patent No.: US 12,558,876 B2
(45) Date of Patent: Feb. 24, 2026

(54) LAMINATED BODY, LAMINATED BODY WITH MEMBER FOR ELECTRONIC DEVICE, AND METHOD FOR PRODUCING ELECTRONIC DEVICE

(71) Applicant: AGC Inc., Tokyo (JP)

(72) Inventors: Hideaki Miyazawa, Tokyo (JP); Kazuo Yamada, Tokyo (JP)

(73) Assignee: AGC Inc., Tokyo (JP)

( * ) Notice: Subject to any disclaimer, the term of this patent is extended or adjusted under 35 U.S.C. 154(b) by 81 days.

(21) Appl. No.: 18/061,801

(22) Filed: Dec. 5, 2022

(65) Prior Publication Data

US 2023/0111130 A1 Apr. 13, 2023

Related U.S. Application Data

(63) Continuation of application No. PCT/JP2021/020757, filed on May 31, 2021.

(30) Foreign Application Priority Data

Jun. 11, 2020 (JP) ................................. 2020-101638

(51) Int. Cl.
*B32B 17/06* (2006.01)
*B32B 3/26* (2006.01)
(Continued)

(52) U.S. Cl.
CPC ............ *B32B 17/061* (2013.01); *B32B 3/266* (2013.01); *B32B 7/12* (2013.01); *B32B 37/20* (2013.01);
(Continued)

(58) Field of Classification Search
CPC ........... B32B 3/266; B32B 7/12; B32B 15/08; B32B 15/20; B32B 17/061;
(Continued)

(56) References Cited

U.S. PATENT DOCUMENTS

2008/0135175 A1 6/2008 Higuchi
2009/0186215 A1* 7/2009 Sato .......................... B32B 7/04
156/182
(Continued)

FOREIGN PATENT DOCUMENTS

CN 107889339 A * 4/2018 ........... H05K 1/0271
JP 2012-115854 A 6/2012
(Continued)

OTHER PUBLICATIONS

"Enhanced adhesion of copper to dielectrics via titanium and chromium additions and sacrificial reactions", Thin Solid Films 262, pp. 154-167, 1995 (Russell) (Year: 1995).*
(Continued)

*Primary Examiner* — Callie E Shosho
(74) *Attorney, Agent, or Firm* — Oblon, McClelland, Maier & Neustadt, L.L.P.

(57) ABSTRACT

A laminated body includes: a supporting base material; an adhesive layer; a metal layer; and a substrate in this order. The metal layer contains at least one metal selected from the group consisting of copper, titanium, palladium, gold, nickel, tungsten, and molybdenum. The metal layer preferably contains at least one metal selected from the group consisting of copper, titanium, palladium, gold, and nickel.

19 Claims, 3 Drawing Sheets

(51) Int. Cl.
*B32B 7/12* (2006.01)
*B32B 37/20* (2006.01)
*B32B 43/00* (2006.01)

(52) U.S. Cl.
CPC ........ *B32B 43/006* (2013.01); *B32B 2250/03* (2013.01); *B32B 2250/40* (2013.01); *B32B 2305/34* (2013.01); *B32B 2310/0843* (2013.01); *B32B 2311/18* (2013.01); *B32B 2315/08* (2013.01); *B32B 2383/00* (2013.01)

(58) Field of Classification Search
CPC ... B32B 17/10798; B32B 37/02; B32B 37/15; B32B 37/20; B32B 43/006; B32B 2250/03; B32B 2250/40; B32B 2305/34; B32B 2310/0843; B32B 2311/12; B32B 2315/08; B32B 2383/00; C23C 14/0617; C23C 14/10; C23C 14/34; H05K 3/38
See application file for complete search history.

(56) References Cited

U.S. PATENT DOCUMENTS

| | | | |
|---|---|---|---|
| 2013/0328214 A1* | 12/2013 | Takano | H01L 23/49894 |
| | | | 257/774 |
| 2017/0282500 A1* | 10/2017 | Miyagoe | B32B 17/10798 |
| 2018/0178492 A1 | 6/2018 | Nagao et al. | |
| 2019/0292419 A1* | 9/2019 | Seitz | C09J 183/14 |

FOREIGN PATENT DOCUMENTS

| | | | |
|---|---|---|---|
| JP | 2019211694 A | * | 12/2019 |
| WO | WO 2007/018028 A1 | | 2/2007 |

OTHER PUBLICATIONS

Machine Translation of CN107889339 (Year: 2018).*
International Search Report issued Jul. 20, 2021, in PCT/JP2021/020757, filed on May 31, 2021, 2 pages.

* cited by examiner

LAMINATED BODY, LAMINATED BODY WITH MEMBER FOR ELECTRONIC DEVICE, AND METHOD FOR PRODUCING ELECTRONIC DEVICE

CROSS-REFERENCE TO RELATED APPLICATIONS

This is a bypass continuation of International Patent Application No. PCT/JP2021/020757, filed on May 31, 2021, which claims priority to Japanese Patent Application No. 2020-101638, filed on Jun. 11, 2020. The contents of these applications are hereby incorporated by reference in their entireties.

TECHNICAL FIELD

The present invention relates to a laminated body, a laminated body with an electronic-device member, and a method for manufacturing the electronic device.

BACKGROUND ART

Thicknesses and weights in electronic devices such as photovoltaic (PV) cells, liquid-crystal panels (LCDs), organic EL panels (OLEDs), and receiving sensor panels which sense electromagnetic waves, X rays, ultraviolet light, visible light, infrared light, etc. are being reduced. Along with this, thicknesses of substrates such as glass substrates for use in such electronic devices are also being reduced. When strength of a substrate is insufficient due to thickness reduction, handleability of the substrate may be lowered to cause a problem, for example, in the step of forming an electronic-device member on the substrate (member formation step).

Recently, in order to cope with the aforementioned issue, a method has been proposed to prepare a glass laminated body in which a glass substrate and a reinforcing plate are laminated on each other, and to separate the reinforcing plate from the glass substrate after an electronic-device member such as a display device is formed on the glass substrate of the glass laminated body (e.g., see PTL 1). The reinforcing plate has a supporting base material and a silicone resin layer fixed on the supporting base material, and the silicone resin layer and the glass substrate are peelably adhered to each other in the glass laminated body.

CITATION LIST

Patent Literature

PTL 1: WO2007/018028

SUMMARY OF INVENTION

Technical Problem

In the PTL 1, when the glass substrate on which the electronic-device member has been disposed is peeled from the reinforcing plate, mechanical peeling is mainly performed to make physical force act on the glass substrate so as to peel off the glass substrate from the reinforcing plate.

On the other hand, in recent years, as the electronic-device member is becoming more sophisticated and complex, it is necessary to handle the electronic-device member with even greater care. The mechanical peeling performed as described in the PTL 1 may have an adverse effect on the electronic-device member.

Laser peeling is a method different from the aforementioned mechanical peeling. The laser peeling is performed to irradiate an object with a laser beam so as to cause peeling between the two members. The laser peeling is preferred, because it can prevent physical force from acting on the electronic-device member. Normally, the formation of the electronic-device member on the substrate often involves heat treatment. Therefore, after the electronic-device member is formed on the substrate by a method involving the heat treatment, it is desirable that the substrate having the electronic-device member can be peeled off from the thus obtained laminated body by the laser peeling.

In addition, when plating treatment can be directly performed on the substrate which has the electronic-device member and which has been peeled off, a new circuit can be desirably formed on the substrate efficiently.

In consideration of the aforementioned actual situation, an object of the invention is to provide a laminated body with which a substrate having an electronic-device member can be peeled off by laser peeling after the electronic-device member is formed on the substrate by a method involving heat treatment (e.g., 200° C. or higher), and which has a seed layer for performing plating treatment on the substrate that has the electronic-device member and that has been peeled off.

Another object of the invention is to provide a laminated body with an electronic-device member, and a method for producing the electronic device.

Solution to Problem

The present inventors diligently made investigations and, as a result, have discovered that the aforementioned objects can be accomplished with the following configurations.

(1) A laminated body including a supporting base material, an adhesive layer, a metal layer, and a substrate in this order, wherein the metal layer contains at least one metal selected from the group consisting of copper, titanium, palladium, gold, nickel, tungsten, and molybdenum.

(2) The laminated body according to the configuration (1), wherein the metal layer contains at least one metal selected from the group consisting of copper, titanium, palladium, gold, and nickel.

(3) The laminated body according to the configuration (1) or (2), wherein the metal layer has a first metal layer and a second metal layer disposed on the first metal layer, and the kind of a metal contained in the first metal layer and the kind of a metal contained in the second metal layer are different from each other.

(4) The laminated body according to the configuration (3), wherein the first metal layer is disposed closer to the substrate side than the second metal layer, and the first metal layer contains titanium.

(5) The laminated body according to the configuration (4), wherein the second metal layer contains copper.

(6) The laminated body according to any one of the aforementioned configurations (1) to (5), wherein the metal layer has a first through hole extending in a thickness direction, the substrate has a second through hole extending in the thickness direction, and the first through hole and the second through hole communicate with each other.

(7) The laminated body according to the configuration (6), further including a metal-coated portion that is made of a metal to cover at least a part of an inner wall face of the second through hole.

(8) The laminated body according to any one of the configurations (1) to (7), wherein the adhesive layer is a silicone resin layer.

(9) The laminated body according to any one of the configurations (1) to (8), wherein
the substrate is a glass substrate.

(10) The laminated body according to any one of the configurations (1) to (9), wherein
the supporting base material is a glass substrate.

(11) A laminated body with an electronic-device member, including:
a laminated body according to any one of the configurations (1) through (10); and an electronic-device member that is disposed on a substrate in the laminated body.

(12) A method for producing an electronic device, including:
a member formation step of forming an electronic-device member on the surface of a substrate of a laminated body according to any one of the configurations (1) to (10) so as to obtain a laminated body with an electronic-device member; and
a separation step of irradiating the laminated body with the electronic-device member with a laser beam from a supporting base material side to peel off the supporting base material and the adhesive layer from the laminated body with the electronic-device member so as to obtain the electronic device having the electronic-device member, the substrate, and a metal layer.

Advantageous Effects of Invention

According to the invention, in consideration of the aforementioned actual situation, it is possible to provide a laminated body with which a substrate having an electronic-device member can be peeled off by laser peeling after the electronic-device member is formed on the substrate by a method involving heat treatment, and which has a seed layer for performing plating treatment on the substrate that has the member for electronic device and that has been peeled off.

According to the invention, it is possible to provide a laminated body with an electronic-device member, and a method for producing the electronic device.

DESCRIPTION OF EMBODIMENTS

Embodiments of the invention are described below with reference to the drawings. However, the following embodiments are mere examples for illustrating the invention, and the invention is not limited to the following embodiments. Incidentally, various modifications and replacements can be made on the following embodiments without departing from the scope of the invention.

A numerical value range represented by use of the expression "to" means a range that includes numerical values put before and after the expression "to" as lower and upper limits.

For example, use of a metal layer containing a predetermined metal is a feature of a laminated body according to the invention.

It has been discovered that a desired effect can be obtained due to the use of the aforementioned configuration. First, when a laminated body according to the invention is irradiated with a laser beam, peeling occurs between an adhesive layer and the metal layer, so that so-called laser peeling can be accomplished. In addition, a substrate that has an electronic-device member and that has been peeled off has the metal layer, and the metal layer can be used as a seed layer during plating treatment.

First Embodiment of Laminated Body

Figure 1:
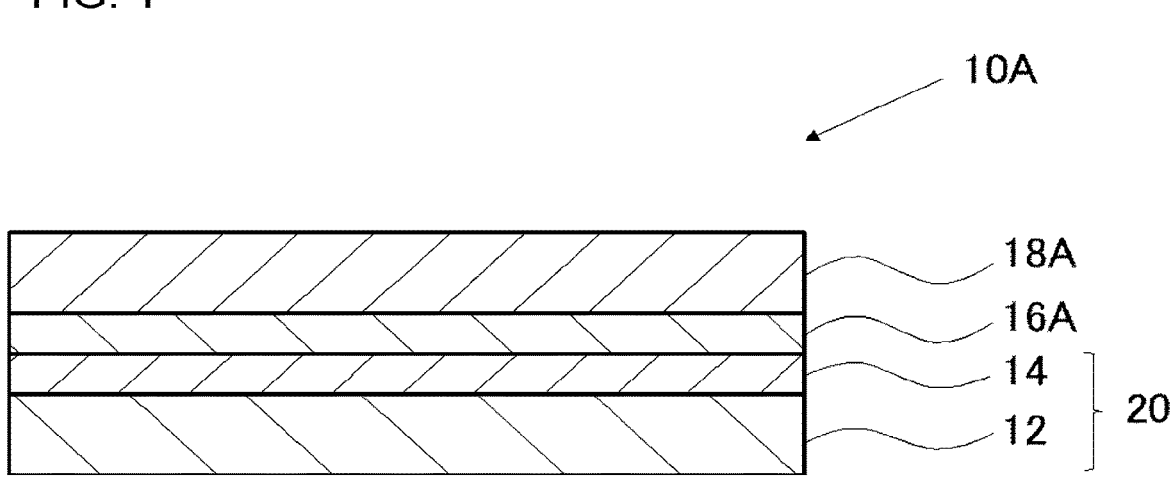
FIG. 1 is a cross-sectional view schematically illustrating a first embodiment of a laminated body according to the invention.

FIG. 1 is a cross-sectional view schematically illustrating a first embodiment of the laminated body according to the invention.

A laminated body 10A has a supporting base material 12, an adhesive layer 14, a metal layer 16A, and a substrate 18A in this order.

As described later, an electronic-device member is formed on the substrate 18A of the laminated body 10A by a method involving heat treatment. When the laminated body 10A having the electronic-device member is then irradiated with a laser beam, the adhesive layer 14 and the metal layer 16A are peeled off from each other at an interface therebetween.

A two-layer portion that consists of the supporting base material 12 and the adhesive layer 14 has a function of reinforcing the substrate 18A. The two-layer portion that consists of the supporting base material 12 and the adhesive layer 14 and that is produced in advance in order to produce the laminated body 10A is also referred to as a supporting base material 20 with an adhesive layer.

As described above, the supporting base material 20 with the adhesive layer in the laminated body 10A is separated. The separated supporting base material 20 with the adhesive layer can be laminated on a new laminated body substrate having a metal layer 16A and a substrate 18A, to be reused as a new laminated body 10A.

The respective layers constituting the laminated body 10A, and then, a method for producing the laminated body 10A are described in detail as follows.

(Supporting Base Material)

The supporting base material 12 is a member that supports and reinforces the substrate 18A.

Examples of the supporting base material 12 include a glass substrate, a plastic plate, and a metal plate (such as an SUS plate). In particular, the glass substrate is preferred.

Preferred kinds of the glass are alkali-free borosilicate glass, borosilicate glass, soda-lime glass, high-silica glass, and other oxide-based glasses each containing silicon oxide as a main component. The oxide-based glasses are preferably glasses each having a silicon oxide content of 40 to 90 mass % in terms of oxide amount.

More specifically, the glass substrate is, for example, a glass substrate made of alkali-free borosilicate glass (trade names "AN100" manufactured by AGC INC.).

The glass substrate is produced usually by melting a raw material for glass and forming the molten glass into a plate shape. Such forming may be conducted by a common method, and examples thereof include a float method, a fusion method, and a slot downdraw method.

The shape (the shape of a main face) of the supporting base material 12 is not particularly limited, but is preferably rectangular or circular.

The thickness of the supporting base material 12 may be thicker or thinner than the substrate 18A. From the viewpoint of handleability of the laminated body 10A, it is preferable that the supporting base material 12 is thicker than the substrate 18A.

It is preferable that the supporting base material 12 is not flexible. Therefore, the thickness of the supporting base material 12 is preferably 0.3 mm or more, and more preferably 0.5 mm or more.

On the other hand, the thickness of the supporting base material 12 is preferably 2.0 mm or less, and more preferably 1.0 mm or less.

(Adhesive Layer)

The adhesive layer 14 is a layer that is adhered to the metal layer 16A in order to prevent positional displacement of the metal layer 16A and the substrate 18A until laser peeling is performed. As described later, irradiation with a laser beam causes peeling between the adhesive layer 14 and the metal layer 16A.

The adhesive layer 14 may be an organic layer or may be an inorganic layer.

Examples of the material of the organic layer include an acrylic resin, a polyolefin resin, a polyurethane resin, a polyimide resin, a silicone resin, a polyimide silicone resin, and a fluorine resin. In addition, some of the resins may be mixed to form the adhesive layer 14.

Examples of the material of the inorganic layer include oxide, nitride, oxynitride, carbide, carbonitride, silicide, and fluoride. The oxide (preferably metal oxide), the nitride (preferably metal nitride), and the oxynitride (preferably metal oxynitride) are, for example, oxide, nitride, and oxynitride of one or more elements selected from the group consisting Si, Hf, Zr, Ta, Ti, Y, Nb, Na, Co, Al, Zn, Pb, Mg, Bi, La, Ce, Pr, Sm, Eu, Gd, Dy, Er, Sr, Sn, In, and Ba.

Examples of the carbide (preferably metal carbide) and the carbonitride (preferably metal carbonitride) include carbide, carbonitride, and carbon oxide of one or more elements selected from the group consisting of Ti, W, Si, Zr, and Nb.

Examples of the silicide (preferably metal silicide) include silicide of one or more elements selected from the group consisting of Mo, W, and Cr.

Examples of the fluoride (preferably metal fluoride) include fluoride of one or more elements selected from the group consisting of Mg, Y, La, and Ba.

The adhesive layer 14 may be a plasma polymerized film.

When the adhesive layer 14 is the plasma polymerized film, examples of the material forming the plasma polymerized film include fluorocarbon monomers such as $CF_4$, $CHF_3$, $C_2H_6$, $C_3H_6$, $C_2H_2$, $CH_3F$, and $C_4H_8$, hydrocarbon monomers such as methane, ethane, propane, ethylene, propylene, acetylene, benzene, and toluene, hydrogen, and $SF_6$.

In particular, from the viewpoint of heat resistance and peelability, the material of the adhesive layer 14 is preferably the silicone resin or the polyimide silicone resin, more preferably the silicone resin, and further preferably the silicone resin formed from addition-reaction type silicone or condensation-reaction type silicone. That is, the adhesive layer 14 is preferably a silicone resin layer.

An embodiment in which the adhesive layer 14 is the silicone resin layer is described in detail as follows.

The silicone resin that forms the silicone resin layer is a resin containing a predetermined organosiloxy unit, and is usually obtained by curing curable silicone. The curable silicone is classified by its curing mechanism into the addition-reaction type silicone, the condensation-reaction type silicone, ultraviolet curable type silicone, and electron-beam curable type silicone, any of which can be used. In particular, the addition-reaction type silicone or the condensation-reaction type silicone is preferred.

The adhesive layer 14 is preferably formed using a curable composition containing the curable silicone.

In addition to the curable silicone, the curable composition may contain a solvent, a platinum catalyst (when the addition-reaction type silicone is used as the curable silicone), a leveling agent, a metal compound, etc. Examples of a metal element included in the metal compound include a $3d$ transition metal, a $4d$ transition metal, a lanthanoid-based metal, bismuth, aluminum, and tin. The content of the metal compound is not particularly limited and may be adjusted properly.

The adhesive layer 14 is preferably bonded to the supporting base material 12 with strong bonding force. A method for enhancing adhesion between the both can be performed as follows. That is, when, for example, the adhesive layer 14 is the silicone resin layer, the silicone resin layer is formed on the surface of the supporting base material 12 (more specifically, the curable silicone (organopolysiloxane) that can form a predetermined silicone resin is cured on the supporting base material 12). Thus, the silicone resin in the silicone resin layer can be brought into contact with the surface of the supporting base material 12 so as to gain high bonding force. In addition, by treatment that is performed to generate strong bonding force between the silicone resin layer and the surface of the support base material 12 (for example, treatment using a coupling agent), the bonding force between the surface of the supporting base material 12 and the silicone resin layer can be enhanced.

The thickness of the adhesive layer 14 is preferably 100 μm or less, more preferably 50 μm or less, and further preferably 30 μm or less. On the other hand, the thickness of the adhesive layer 14 is preferably more than 1 μm, and more preferably 4 μm or more. The aforementioned thickness is an arithmetic average of thicknesses of the adhesive layer 14 measured at five or more arbitrary points by a contact-type film thickness measuring device.

(Metal Layer)

The metal layer 16A is in contact with the adhesive layer 14. After being irradiated with a laser beam, the metal layer 16A is peeled off together with the substrate 18A from the adhesive layer 14. The metal layer 16A then functions as a seed layer for plating treatment.

The metal layer 16A contains at least one metal selected from the group consisting of copper, titanium, palladium, gold, nickel, tungsten, and molybdenum.

In particular, from the viewpoint of excellent peelability during laser peeling, the metal layer 16A preferably contains at least one metal selected from the group consisting of copper, titanium, palladium, gold, and nickel.

The metal layer 16A may contain only one metal or may contain multiple metals.

The metal layer 16A may have a single layer structure or may have a multilayer structure.

When the metal layer 16A has the single layer structure, the metal layer 16A preferably contains at least one metal selected from the group consisting of titanium, palladium, gold, nickel, tungsten, and molybdenum from the viewpoint of superior adhesion between the metal layer 16A and the substrate 18A after the substrate having the metal layer 16A is peeled off by laser peeling.

When the metal layer 16A has the multilayer structure, the structure of the metal layer 16 may be a laminated structure of a plurality of layers containing different metals respectively.

For example, assume that the metal layer 16A has a two-layer structure. In this case, the metal layer 16A has a first metal layer and a second metal layer disposed on the first metal layer, and the kind of a metal contained in the first metal layer and the kind of a metal contained in the second metal layer are different from each other.

Although the form in which the metal layer 16A has the two-layer structure has been described above in detail, the metal layer 16A may have a laminated structure of three or more layers alternatively.

In the case where the metal layer 16A has the multilayer structure, the metal layer 16A has the first metal layer and the second metal layer disposed on the first metal layer, the first metal layer is disposed closer to the substrate 18A than the second metal layer, and the first metal layer preferably contains titanium, from the viewpoint of superior adhesion between the metal layer 16A and the substrate 18A after the electronic-device member is formed on the substrate 18A by a method involving heat treatment.

The second metal layer preferably contains copper in this form.

The thickness of the metal layer 16A is not particularly limited, and is preferably 5 to 1000 nm and more preferably 10 to 500 nm from the viewpoint of superior adhesion between the metal layer 16A and the substrate 18A after the substrate having the metal layer 16A is peeled off by laser peeling.

When the metal layer 16A has the two-layer structure having the first metal layer and the second metal layer, and the first metal layer is disposed closer to the substrate 18A than the second metal layer, the thickness of the first metal layer is preferably 5 to 300 nm and more preferably 10 to 200 nm, and the thickness of the second metal layer is preferably 5 to 600 nm, and more preferably 10 to 400 nm.

(Substrate)

The substrate 18A is a member for forming a device member thereon.

The kind of the substrate 18A is not particularly limited, and examples thereof include a glass substrate, a plastic plate, and a metal plate (such as an SUS plate). In particular, the glass substrate is preferred.

Examples of the specific kind of the glass substrate include those described for the glass substrate described for the aforementioned supporting base material 12.

From the viewpoint of thickness reduction and/or weight reduction, the thickness of the substrate 18A is preferably 0.5 mm or less, more preferably 0.4 mm or less, further preferably 0.2 mm or less, and particularly preferably 0.10 mm or less. When the thickness of the substrate 18A is 0.5 mm or less, excellent flexibility can be given to the substrate 18A. When the thickness of the substrate 18A is 0.2 mm or less, the substrate 18A can be wound into a roll shape.

In addition, the thickness of the substrate 18A is preferably 0.03 mm or more, from the viewpoint of easy handling of the substrate 18A.

The substrate 18A may consist of two or more layers, in which case the materials forming the respective layers may be the same or different in kind.

<Method for Producing Laminated Body>

A method for producing the laminated body 10A is not particularly limited, and can be any of known methods.

In particular, from the viewpoint of superior productivity, the method for producing the laminated body 10A preferably has an adhesive layer formation step of forming the adhesive layer 14 on the supporting base material 12 so as to obtain a supporting base material with an adhesive layer, a metal layer formation step of forming the metal layer 16A on the substrate 18A so as to obtain a substrate with a metal layer, and a lamination step of laminating the supporting base material with the adhesive layer and the substrate with the metal layer on each other to bring the adhesive layer 14 and the metal layer 16A into contact so as to obtain the laminated body 10A.

The adhesive layer formation step, the metal layer formation step, and the lamination step are described below in detail.

(Adhesive Layer Formation Step)

The adhesive layer formation step is a step of forming the adhesive layer 14 on the supporting base material 12 so as to obtain the supporting base material with the adhesive layer. The method for forming the adhesive layer 14 is not particularly limited. Known methods can be used depending on the kind of the material forming the adhesive layer 14.

When, for example, the adhesive layer 14 is an organic layer, examples of the method for producing the organic layer include a method (application method) in which a curable resin composition containing a curable resin is applied onto the supporting base material 12, and the layer of the curable resin composition formed thus is then cured to form the adhesive layer 14 fixed on the supporting base material 12, and a method (attachment method) in which the adhesive layer 14 shaped like a film is fixed to the surface of the supporting base material 12. In particular, from the viewpoint of superior adhesion strength of the adhesive layer 14 to the supporting base material 12, the application method is preferred.

In the application method, the curable resin composition layer is formed on the surface of the supporting base material 12, for example, by a coating method in which the surface of the supporting base material 12 is coated with the curable resin composition. Examples of the coating method include a spray coat method, a die coat method, a spin coat method, a dip coat method, a roll coat method, a bar coat method, a screen printing method, and a gravure coat method.

The curing method is not particularly limited, and optimal curing conditions can be selected according to the resin to be used. Usually, heat treatment is used as the curing method.

In addition to the above, the organic layer may be manufactured by a known method.

For example, the method for producing an adhesive layer containing fluororesin is not particularly limited, and examples thereof include a method for producing the adhesive layer using a composition containing the fluororesin and a method for producing the adhesive layer on the surface of an object by irradiation with plasma using fluorine-based gas.

In addition, in the case where the adhesive layer 14 is an inorganic layer, a known method can be used to produce the inorganic layer. For example, the inorganic layer made of a predetermined component is provided on the supporting base material 12 by vapor deposition, sputtering, or CVD.

As the method for producing an inorganic layer made of carbide (carbon material), for example, a resin composition containing a resin component such as a phenol resin is applied on the supporting base material 12, and then sintered to be carbonized.

Optimal manufacturing conditions for the various methods can be selected properly according to the material to be used.

(Metal Layer Formation Step)

The metal layer formation step is a step of forming the metal layer 16A on the substrate 18A so as to obtain the substrate with the metal layer.

The method for forming the metal layer 16A is not particularly limited. A known method can be used as the method. For example, the metal layer 16A made of a predetermined component is provided on the substrate 18A by vapor deposition, sputtering, or CVD.

(Lamination Step)

The lamination step is a step of laminating the supporting base material with the adhesive layer on the substrate with the metal layer so that the adhesive layer 14 of the supporting base material with the adhesive layer obtained in the aforementioned adhesive layer formation step is brought into contact with the metal layer 16A of the substrate with the metal layer obtained in the aforementioned metal layer formation step, thereby obtaining the laminated body 10A.

The method for laminating the supporting base material with the adhesive layer and the substrate with the metal layer on each other is not particularly limited. A known method can be used as the method.

For example, the supporting base material with the adhesive layer and the substrate with the metal layer are superimposed on each other under a normal pressure environment. If necessary, the supporting base material with the adhesive layer and the substrate with the metal layer may be pressure-bonded together by use of a roll or a press after the supporting base material with the adhesive layer and the substrate with the metal layer are laminated on each other. By the pressure bonding using the roll or the press, air bubbles mixed between the adhesive layer 14 and the metal layer 16 can be relatively easily removed. Therefore, the pressure bonding using the roll or the press is preferred.

When the supporting base material with the adhesive layer and the substrate with the metal layer are pressure-bonded by vacuum lamination or vacuum pressing, mixture of air bubbles can be suppressed and good adhesion can be ensured, which is more preferred. Due to the pressure bonding under vacuum, minute air bubbles that may even remain can be prevented from growing by heating. Thus, there is another advantage that the minute air bubbles do not easily cause distortion defects.

To laminate the supporting base material with the adhesive layer and the substrate with the metal layer on each other, it is preferable that the surface of the adhesive layer 14 and the surface of the metal layer 16A are thoroughly cleaned and laminated on each other in a high-cleanness environment.

After the supporting base material with the adhesive layer and the substrate with the metal layer are laminated on each other, pre-annealing treatment (heat treatment) may be performed if necessary. Due to the pre-annealing treatment performed thus, adhesion between the supporting base material with the adhesive layer and the substrate with the metal layer is improved.

Second Embodiment of Laminated Body

Figure 2:
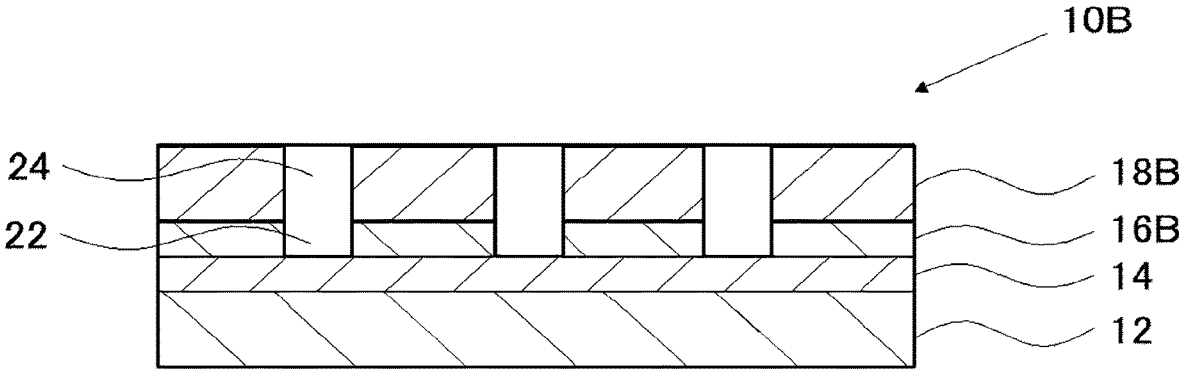
FIG. 2 is a cross-sectional view schematically illustrating a second embodiment of the laminated body according to the invention.
Figure 3:
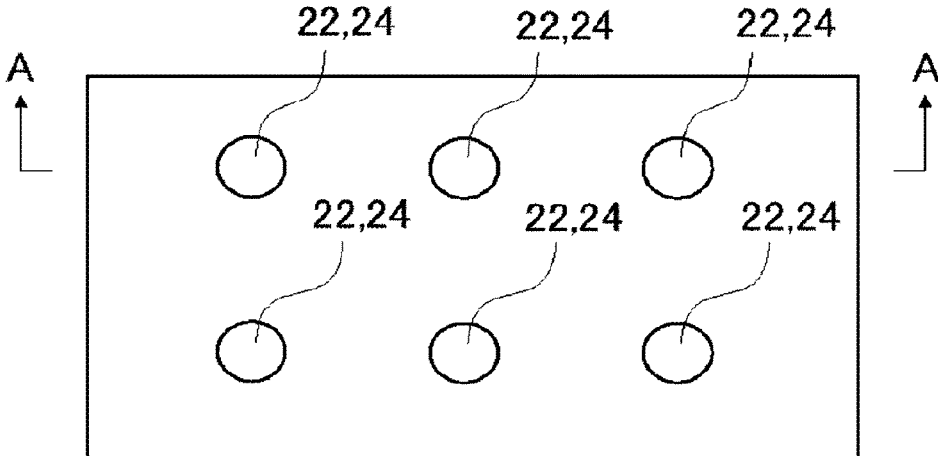
FIG. 3 is a top view of the laminated body shown in FIG. 2.

FIG. 2 is a cross-sectional view schematically illustrating a second embodiment of the laminated body according to the invention. FIG. 3 is a top view of the laminated body shown in FIG. 2. FIG. 2 corresponds to a cross-sectional view taken along a line A-A in FIG. 3.

The laminated body 10B has a supporting base material 12, an adhesive layer 14, a metal layer 16B, and a substrate 18B in this order.

The laminated body 10B according to the second embodiment has the same configurations as those in the aforementioned laminated body 10A according to the first embodiment, except that each of the metal layer 16B and the substrate 18B has through holes. The same configurations in the laminated body 10B as those in the laminated body 10A are designated by the same signs, and description thereof is omitted.

The metal layer 16B has a plurality of first through holes 22 each extending along a thickness direction of the metal layer 16B.

In addition, the substrate 18B has a plurality of second through holes 24 each extending along the thickness direction of the substrate 18B.

The first through holes 22 and the second through holes 24 communicate with each other.

A boundary between the first through holes 22 and the second through holes 24 is positioned at an interface in the thickness direction between the metal layer 16B and the substrate 18B.

When the substrate in the laminated body has the through holes as described above, conduction between electronic devices disposed on opposite sides of the substrate can be attained due to an electrically conductive material (such as metal) with which the through holes are filled. As described later, plating treatment is enumerated as the method for filling the through holes with the electrically conductive material.

The diameter of each of opening portions of the first through holes 22 is not particularly limited. The diameter of the opening portion is preferably 5 to 500 μm, and more preferably 10 to 200 μm from the viewpoint that the metal is easily filled into the first through hole 22. When the shape of the opening portion of the first through hole is not a perfect circle, a long diameter is used as the aforementioned diameter.

The diameter of each of opening portions of the second through holes 24 is not particularly limited. The diameter of the opening portion is preferably 10 to 500 μm, and more preferably 15 to 200 μm from the viewpoint that the metal is easily filled into the second through hole 24. When the shape of the opening portion of the second through hole is not a perfect circle, a long diameter is used as the aforementioned diameter.

Each of the number of the first through holes 22 and the number of the second through holes 24 may be one or more.

When the first through holes 22 and the second through holes 24 are provided, an optimal distance (e.g., which may be 20 to 400 μm) between centers of adjacent ones of the through holes in an in-plane direction can be selected according to an application of usage.

In FIG. 2, the opening portion of the first through hole 22 and the opening portion of the second through hole 24 have the same size in the form. However, the invention is not limited to this form, and the sizes of the both may be different.

The method for producing the laminated body 10B shown in FIG. 2 is not particularly limited. For example, the method includes a method for carrying out the aforementioned metal layer formation step, then carrying out a through hole formation step of making the through holes penetrating the substrate and the metal layer respectively, and then carrying out the aforementioned lamination step using the obtained substrate with the metal layer having the through holes.

Figure 4:
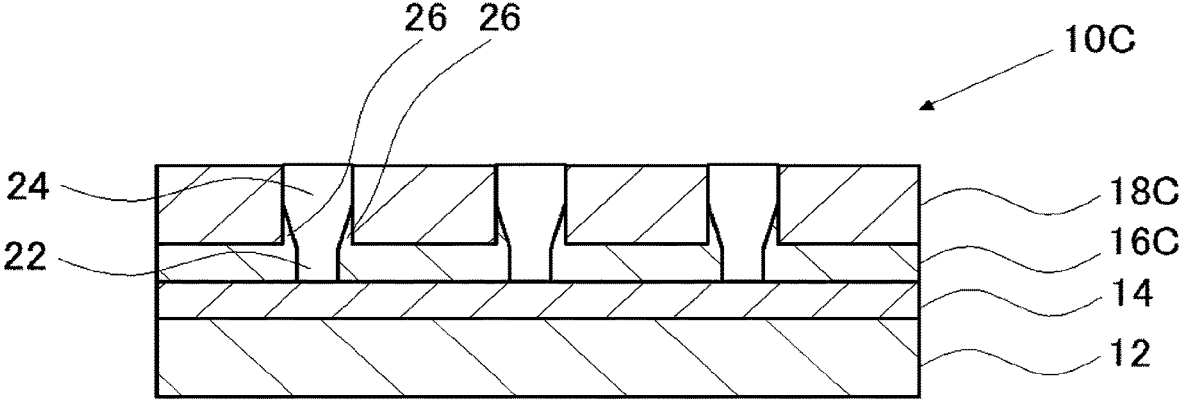
FIG. 4 is a cross-sectional view schematically illustrating a modification of the second embodiment of the laminated body according to the invention.

A form shown in FIG. 4 is enumerated as a modification of the second embodiment.

A laminated body 10C shown in FIG. 4 has a supporting base material 12, an adhesive layer 14, a metal layer 16C, and a substrate 18C in this order, and the metal layer 16C and the substrate 18C have first through holes 22 and second through holes 24 respectively.

The laminated body 10C further has metal-coated portions 26 that are made of metal to cover at least parts of inner wall faces of the second through holes 24 of the substrate 18C.

The metal-coated portions 26 correspond to portions that cover at least the parts of the inner wall faces of the second through holes 24 on the substrate 18C side from an interface in a thickness direction of the metal layer 16C and the substrate 18C.

Since the laminated body 10C has the metal-coated portions 26, peelability between the adhesive layer 14 and the metal layer 16C is improved during laser peeling.

Details of the reason why the peelability is improved thus are unknown. However, in the case where the metal layer 16C has the first through holes 22 and the substrate 18C has the second through holes 24, the adhesive layer 14 may pass through the first through hole 22 to reach the inner wall faces of the second through holes 24 of the substrate 18C. Such a phenomenon is apt to occur particularly when the adhesive layer 14 undergoes plastic deformation as easily as a resin layer (such as a silicone resin layer). When parts of the adhesive layer 14 reach the inner wall faces of the second through holes 24 of the substrate 18C to come into contact therewith, the peelability of a substrate with a metal layer from the adhesive layer 14 may be affected. On the other hand, when the aforementioned metal-coated portions 26 are provided, the metal-coated portions 26 can prevent the adhesive layer 14 from directly contacting the inner wall faces of the second through holes 24 of the substrate 18C, and can suppress peeling failure of the substrate with the metal layer during laser peeling.

In the laminated body 10C shown in FIG. 4, the metal-coated portions 26 and the metal layer 16C are continuous to each other as one piece, but at least parts of the metal-coated portions 26 may be separated from the metal layer 16C.

In the laminated body 10C shown in FIG. 4, the metal-coated portions 26 are provided to cover the entire circumferences of the inner wall faces on the metal layer 16C side of the second through holes 24 of the substrate 18C. The invention is not limited to this form, and it may go well as long as the metal-coated portions 26 are provided on the parts of the inner wall faces of the second through holes 24.

As shown in FIG. 4, it is preferable that the metal-coated portions 26 are provided so as to extend from the interface in the thickness direction between the metal layer 16C and the substrate 18C toward the substrate 18C side.

The kind of the metal forming the metal-coated portions 26 is not particularly limited, but at least one metal that is selected from the group consisting of copper, titanium, palladium, gold, nickel, tungsten and molybdenum and that is the metal forming the metal layer 16C is preferred.

The kind of the metal forming the metal-coated portions 26 and the kind of the metal forming the metal layer 16C may be the same or may be different. However, from the viewpoint of productivity, it is preferable that the both are the same.

The method for producing the laminated body 10C shown in FIG. 4 is not particularly limited. The method includes, for example, a method in which a metal is deposited on one surface of a substrate having through holes each extending along the thickness direction, by vapor deposition, sputtering, or CVD, so as to form a substrate with a metal layer consisting of the metal layer 16C and the substrate 18C, and then, the aforementioned lamination step is carried out using the thus obtained substrate with the metal layer.

<Applications of Laminated Bodies>

The laminated bodies (the aforementioned laminated bodies according to the first and second embodiments) can be used for various applications, such as applications of producing electronic components such as display device panels, PVs, thin-film rechargeable batteries, semiconductor wafers with circuits formed on their surfaces, and receiving sensor panels. In these applications, the laminated bodies may be exposed in high temperature conditions (e.g., 450° C. or higher) under an atmosphere (e.g., for 20 minutes or longer).

The display device panels include LCDs, OLEDs, electronic papers, plasma display panels, field emission panels, quantum dot LED panels, micro LED display panels, MEMS shutter panels, etc.

The receiving sensor panels include electromagnetic wave receiving sensor panels, X-ray receiving sensor panels, ultraviolet light receiving sensor panels, visible light receiving sensor panels, infrared light receiving sensor panels, etc. A substrate used for any of the receiving sensor panels may be reinforced by a reinforcing sheet etc. of a resin etc.

<Method for Producing Electronic Device>

An electronic device including an electronic device member which is described later is produced using a laminated body.

Figure 5:
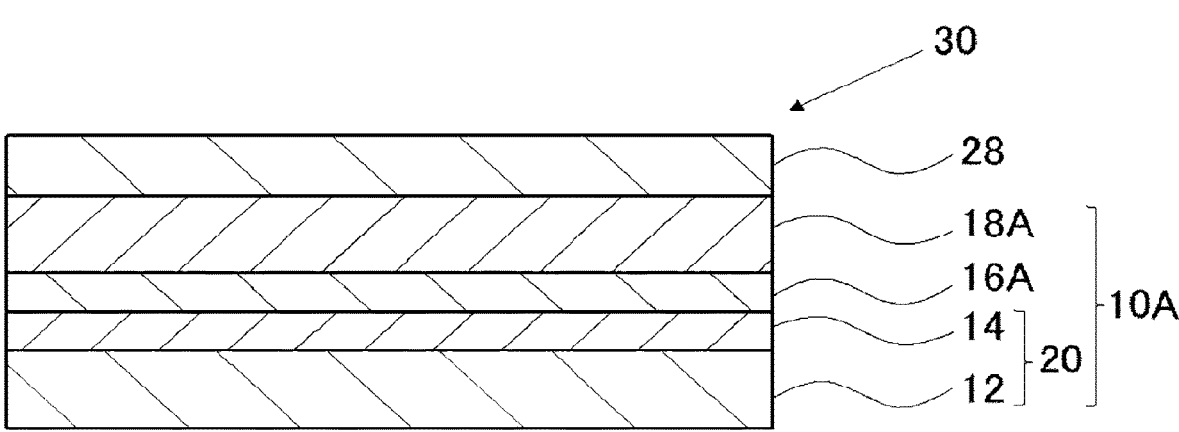
FIG. 5 is a view for illustrating a member formation step.
Figure 6:
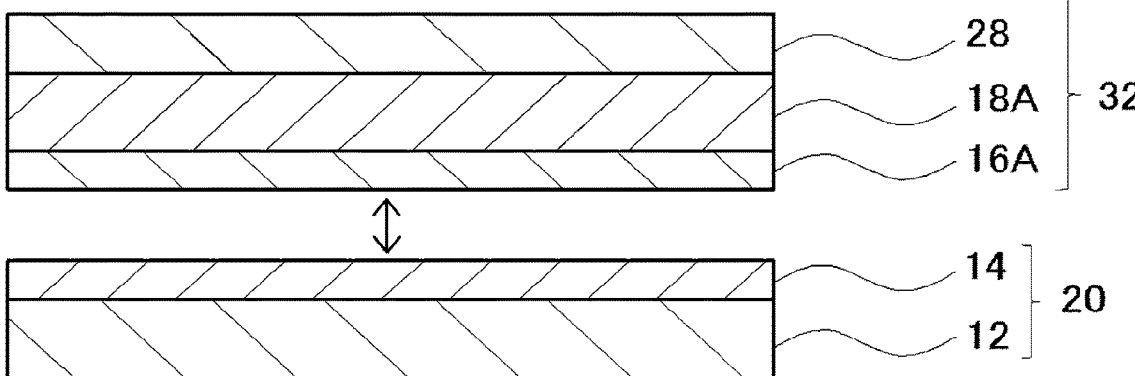
FIG. 6 is a view for illustrating a separation step.

For example, as shown in FIG. 5 and FIG. 6, the method for producing the electronic device includes a method including a member formation step of forming an electronic device member 28 on a substrate 18A of a laminated body 10A (on a surface of the substrate 18A on the opposite side to a metal layer 16A) so as to obtain a laminated body 30 with an electronic device member, and a separation step of irradiating the laminated body 30 with the electronic device member with a laser beam from the side of a supporting base material 12 to peel off the supporting base material 12 and an adhesive layer 14 from the laminated body 30 with the electronic device member so as to obtain an electronic device 32 having the electronic device member 28, the substrate 18A, and the metal layer 16A.

In the above description, the laminated body 10A described in the first embodiment has been taken as a representative example of the laminated body. However, an electronic device can be also produced by the same procedure using the laminated body 10B or the laminated body 10C described in the second embodiment.

Hereinafter, the step of forming the electronic device member 28 is referred to as "member formation step", and a step of separating the laminated body 30 with the electronic device member into the electronic device 32 and a supporting base material 20 with an adhesive layer is referred to as "separation step".

Materials and procedures used in the respective steps are described below in detail.

(Member Formation Step)

The member formation step is a step of forming the electronic device member on the substrate 18A of the laminated body 10A. More specifically, as shown in FIG. 5, the electronic device member 28 is formed on the substrate 18A (on the surface of the substrate 18A on the opposite side to the metal layer 16A) so as to obtain the laminated body 30 with the electronic device member.

First, the electronic device member 28 used in the present step is described in detail, and then, the procedure of the steps is described in detail.

(Electronic Device Member)

The electronic device member 28 is a member that constitutes at least a part of the electronic device formed on the substrate 18A of the laminated body 10A. More specifically, the electronic device member 28 is, for example, a display device panel, a solar cell, a thin-film rechargeable battery, an electronic component such as a semiconductor wafer with a circuit formed on its surface, a member used for a receiving sensor panel (such as a display device member such as a thin-film transistor, a solar cell member, a thin-film rechargeable battery member, an electronic component circuit, or a receiving sensor member), or the like. Examples of the electronic device member 28 include a solar cell member described in Paragraph [0192] of US2018/0178492, a thin-film rechargeable battery member described in Paragraph [0193] of the same publication, and an electronic component circuit described in Paragraph [0194] of the same publication.

(Procedure of Steps)

The method for producing the aforementioned laminated body 30 with the electronic device member is not particularly limited. The electronic device member 28 is formed on the substrate 18 of the laminated body 10A by a conventionally known method according to the kind of a constituent member of the electronic device member.

The electronic device member 28 may be a part (hereinafter referred to as "partial member") of the member ultimately formed on the substrate 18A, rather than the entirety of the member (hereinafter referred to as "entire member"). A substrate with a partial member, that has been peeled off from the adhesive layer 14, may be converted to a substrate with an entire member (corresponding to an undermentioned electronic device) in a subsequent step.

Another electronic device member may be formed on a peeling face of the substrate with the entire member, which has been peeled off from the adhesive layer 14. Further, the electronic device can be also produced as follows. That is, a laminated body with an entire member is assembled out of two laminated bodies 30 with electronic device members so that the electronic device members 28 thereof are made to face each other, and bonded to each other. Then, two supporting base materials 20 with adhesive layers are peeled off from the laminated body with the entire member.

For example, assume that an OLED is to be produced. In this case, in order to form an organic EL structure body on a surface of the substrate 18A of the laminated body 10A on the opposite side to the metal layer 16A, various layer formations or treatments such as forming a transparent electrode, depositing a hole injection layer, a hole transport layer, a light emission layer, an electron transport layer, etc. by vapor on a face where the transparent electrode has been formed, forming a back electrode, and sealing with a sealing plate, are performed. Specifically, examples of the various layer formations or treatments include film formation treatment, vapor deposition treatment, adhesion treatment of the sealing plate, etc.

In the case in which the laminated body 10B or the laminated body 10C is used, the through holes are made in the substrate 18B or the substrate 18C. Accordingly, due to plating treatment performed during formation of the electronic device member, the through holes can be filled with an electrically conductive material (metal).

(Separation Step)

As shown in FIG. 6, the separation step is a step of irradiating the laminated body 30 with the electronic device member with a laser beam from the supporting base material 12 side to peel off the supporting base material 12 and the adhesive layer 14 from the laminated body 30 with the electronic device member, so as to obtain an electronic device 32 including the electronic device member 28, the substrate 18A and the metal layer 16A.

When the electronic device member 28 on the peeled substrate 18A is a part for forming an entire constituent member necessary, the remaining constituent member or members may be formed on the substrate 18A after the separation.

When the laminated body 30 with the electronic device member is irradiated with the laser beam from the supporting base material 12 side, absorption of the laser beam occurs in the metal layer 16A and peeling occurs between the adhesive layer 14 and the metal layer 16A. The detailed reason why the peeling occurs is unknown. However, it is considered that the temperature of the metal layer 16A locally rises due to the absorption of the laser beam by the metal layer 16A, to cause decomposition of the adhesive layer 14 adjacent to the metal layer 16A, so as to cause peeling between the adhesive layer 14 and the metal layer 16A.

Although the laser irradiation conditions are not particularly limited, laser wavelengths of 193 to 10600 nm are preferred, and laser wavelengths of 300 to 1064 nm are more preferred.

The beam size (area) of the laser is preferably 10 to 500 $mm^2$.

Repetition frequency of the laser is preferably 10 to 10000 Hz.

The overlap ratio of the laser is preferably 10 to 90%.

Irradiation energy is preferably 10 to 300 $mJ/cm^2$.

Since the electronic device obtained by the separation includes the metal layer, plating treatment can be further performed on the obtained electronic device.

EXAMPLES

The invention is specifically described below according to Examples, etc. However, the invention is not limited by these examples.

In the following description, Examples 1 to 17 are Examples, and Examples 18 to 22 are Comparative Examples.

A glass plate ("AN100", manufactured by AGC INC.) measuring 200 by 200 mm and 0.5 mm thick was used as the supporting base material below.

A glass plate ("AN100", manufactured by AGC INC.) measuring 200 by 200 mm and 0.15 mm thick, and a substrate in which through holes (hole diameter: 100 μm, hole pitch (distance between centers of adjacent ones of holes): 200 μm) were formed in a 180×180 mm-sized center portion of a glass plate ("AN100", manufactured by AGC INC.) measuring 200 by 200 mm and 0.13 mm thick were used as the substrate.

The supporting base material and the substrate were cleaned with an aqueous glass cleaning agent ("PK-LCG213", Parker Corporation), and then cleaned with pure water.

<Evaluations>

(Evaluation of Presence/Absence of Metal-Coated Portions on Inner Wall Faces of Through Holes of Substrate)

In each of Examples 12 through 17, the cross sections of the through hole portions in each of the substrates which had the through holes and on which a metal layer was formed were observed with a scanning electron microscope (SEM). Presence/absence of metal-coated portions on inner wall faces of the through holes of the substrate was evaluated.

A case where the metal-coated portions were present was evaluated as "Yes", and a case where the metal-coated portions were absent was evaluated as "No". A case where no evaluation was made was expressed as "-".

(Peeling Evaluation)

A laser device having a laser wavelength of 355 nm, a beam size of 40×0.4 mm, and a laser repetition frequency of 20 Hz was used to perform a peeling test on the laminated body which had been subjected to heat treatment.

The laser beam was adjusted so that the laser beam was incident on the laminated body from the supporting base material side, an overlap ratio of an irradiation shape with the laser beam to the laminated body was 50 to 90%, and irradiation energy density was 10 to 260 mJ/cm².

After the irradiation with the laser beam, a peeling state where the substrate with the metal layer including the metal layer and the substrate was peeled from an adhesive layer with a peeling interface between the adhesive layer and the metal layer was visually checked and evaluated according to the following criteria. When the peeling state was evaluated as A or B in the following evaluation criteria, it can be judged that the peeling state was within a practically acceptable range.

A: Entirely peeled between the adhesive layer and the metal layer.

B: Partially not peeled between the adhesive layer and the metal layer.

C: Not peeled between the adhesive layer and the metal layer.

(Function Evaluation of Seed Layer)

A copper or gold plating film was attempted to be formed on the face of the metal layer of the substrate with the metal layer that had been peeled off and subjected to the aforementioned (peeling evaluation), by electrolytic or electroless plating. A formation state in which the plating film was formed was visually checked and evaluated according to the following criteria. When the formation state was evaluated as A or B in the following evaluation criteria, it can be judged that the formation state was within a practically acceptable range.

A: The plating film was formed all over the metal layer.

B: The plating film was formed partially on the metal layer.

C: The plating film was not formed at all on the metal layer.

(Adhesion Force Evaluation of Metal Layer)

An adhesive tape ("600-1-18DN", 3M Japan Limited) was pasted on the face of the metal layer of the substrate with the metal layer, that had been peeled off and subjected to the aforementioned (peeling evaluation). The tape was pulled to be perpendicular to the film face, and then the tape was pulled off. A condition of the metal layer from which the tape had been pulled off was visually checked and evaluated according to the following criteria. When the condition of the metal layer was evaluated as A or B in the following evaluation criteria, it can be judged that the condition of the metal layer was within a practically acceptable range.

A: No coming off was observed in the metal layer.

B: Partial coming off was observed in the metal layer.

C: Coming off was observed in the entire face of the metal layer.

<Preparation of Curable Silicone 1 and Curable Composition 1>

(Preparation of Curable Silicone 1)

Organohydrogen siloxane and alkenyl group-containing siloxane were mixed to obtain curable silicone 1. The curable silicone 1 had the following composition. That is, the molar ratio among M units, D units, and T units was 9:59:32, the molar ratio of methyl groups to phenyl groups in organic groups was 44:56, the molar ratio of hydrogen atoms bonded to all silicon atoms to all alkenyl groups (hydrogen atoms/alkenyl groups) was 0.7, and an average number of OX groups was 0.1. The average number of OX groups was a numerical value indicating how many OX groups (X is a hydrogen atom or a hydrocarbon group) were bonded to one Si atom on average.

(Preparation of Curable Composition 1)

To a solution in which diethylene glycol diethyl ether ("Hisolve EDE", manufactured by Toho Chemical Industry Co., Ltd.) (84.9 g) and curable silicone 1 (200 g) were mixed, platinum (0)-1,3-divinyl-1,1,3,3-tetramethyldisiloxane (CAS No. 68478-92-2) was added so that the content of a platinum element with respect to the curable silicone 1 was 120 ppm. Thus, a mixture A was obtained. Methylphenyl-modified silicone ("AP 1000", manufactured by Wacker Asahikasei Silicone Co., Ltd.) (0.500 g) was mixed to the mixture A, and a mixed solution obtained thus was filtered through a filter with a pore diameter of 0.45 μm. Thus, a curable composition 1 was obtained.

Example 1

The prepared curable composition 1 was applied to the supporting base material, heated at 140° C. for 5 minutes using a hot plate, and successively heated at 250° C. for 30 minutes using an oven. Thus, a silicone resin layer with a thickness of 10 μm was formed. As a result, a supporting base material with a silicone resin layer was obtained.

Next, a metal layer was formed on the surface of a separately prepared substrate by use of a sputtering device. In Example 1, a Ti layer was formed as the first layer and a Cu layer was formed as the second layer so as to obtain a substrate with a metal layer.

Then, the supporting base material with the silicone resin layer and the substrate with the metal layer were bonded together using a bonding device so that the silicone resin layer and the metal layer came into contact with each other. As a result, a laminated body was obtained.

The obtained laminated body was heated at 300° C. for 30 minutes under a nitrogen atmosphere using an inert gas oven.

The aforementioned various evaluations were performed on the obtained laminated body.

Examples 2 to 22

As shown in undermentioned tables, the various evaluations were performed according to the same procedure as that in Example 1, except that the type of a substrate to be used and the kind of a metal film were changed.

As to each of Examples 12 to 15, a substrate having through holes was used and a metal layer was formed on the surface of the substrate using a sputtering device.

As to each of Examples 16 and 17, after a substrate with a metal layer was obtained according to the same procedure as that in Example 1, through holes were made to penetrate the substrate and the metal layer, and then, the substrate with the metal layer were bonded to a supporting base material with a silicone resin layer.

In Tables 1 through 4, the notation in a column "Metal Layer" indicates the metal kind and thickness in the metal layer. For example, "Ti/50 nm" represents a Ti layer with a thickness of 50 nm.

In Tables 1 through 4, a column "Adhesion Evaluation of Metal-Coated Portions" indicates a result of the aforementioned (evaluation of the presence/absence of the metal-coated portions on the inner wall faces of the through holes of the substrate).

TABLE 1-continued

|  |  | Examples | | | | | |
| --- | --- | --- | --- | --- | --- | --- | --- |
|  |  | 1 | 2 | 3 | 4 | 5 | 6 |
| Function Evaluation of Seed Layer |  | A | A | A | A | A | A |
| Adhesion Force Evaluation of Metal Layer |  | A | A | A | A | B | A |

TABLE 2

|  |  | Examples | | | | |
| --- | --- | --- | --- | --- | --- | --- |
|  |  | 7 | 8 | 9 | 10 | 11 |
| Substrate | Thickness | 0.15 mm | 0.15 mm | 0.15 mm | 0.15 mm | 0.15 mm |
|  | Presence of Through Holes | No | No | No | No | No |
| Metal Layer | First Layer | Ni/ 50 nm | Ti/ 50 nm | Ti/ 50 nm | W/ 50 nm | Mo/ 50 nm |
|  | Second Layer | — | Au/ 100 nm | — | — | — |
| Adhesion Evaluation of Metal-Coated Portions |  | — | — | — | — | — |
| Peeling Evaluation |  | A | A | A | A | A |
| Function Evaluation of Seed Layer |  | A | A | A | B | B |
| Adhesion Force Evaluation of Metal Layer |  | A | A | A | A | A |

TABLE 1

|  |  | Examples | | | | | |
| --- | --- | --- | --- | --- | --- | --- | --- |
|  |  | 1 | 2 | 3 | 4 | 5 | 6 |
| Substrate | Thickness | 0.15 mm | 0.15 mm | 0.15 mm | 0.15 mm | 0.15 mm | 0.15 mm |
|  | Presence of Through Holes | No | No | No | No | No | No |
| Metal layer | First Layer | Ti/ 50 nm | Ti/ 50 nm | Ti/ 10 nm | Ti/ 50 nm | Cu/ 50 nm | Pd/ 50 nm |
|  | Second Layer | Cu/ 50 nm | Cu/ 150 nm | Cu/ 150 nm | Cu/ 300 nm | — | — |
| Adhesion Evaluation of Metal-Coated Portions |  | — | — | — | — | — | — |
| Peeling Evaluation |  | A | A | A | A | A | A |

TABLE 3

|  |  | Examples | | | | | |
| --- | --- | --- | --- | --- | --- | --- | --- |
|  |  | 12 | 13 | 14 | 15 | 16 | 17 |
| Substrate | Thickness | 0.13 mm | 0.13 mm | 0.13 mm | 0.13 mm | 0.13 mm | 0.13 mm |
|  | Presence of Through Holes | Yes | Yes | Yes | Yes | Yes | Yes |
| Metal layer | First Layer | Ti/10 nm | Ti/50 nm | Ti/50 nm | Ti/50 nm | Ti/50 nm | Ti/50 nm |
|  | Second Layer | Cu/150 nm | Cu/50 nm | Cu/150 nm | Cu/300 nm | Cu/150 nm | Cu/300 nm |
| Adhesion Evaluation of Metal-Coated Portions |  | Yes | Yes | Yes | Yes | No | No |
| Peeling Evaluation |  | A | A | A | A | B | B |
| Function Evaluation of Seed Layer |  | A | A | A | A | A | A |
| Adhesion Force Evaluation of Metal Layer |  | A | A | A | A | A | A |

19

TABLE 4

| | | Examples | | | | |
|---|---|---|---|---|---|---|
| | | 18 | 19 | 20 | 21 | 22 |
| Substrate | Thickness | 0.15 mm | 0.15 mm | 0.15 mm | 0.15 mm | 0.15 mm |
| | Presence of Through Holes | No | No | No | No | No |
| Metal Layer | First Layer | CuO/ 50 nm | ITO/ 150 nm | Al/ 50 nm | Ag/ 50 nm | a-Si/ 100 nm |
| | Second Layer | — | — | — | — | — |
| Adhesion Evaluation of Metal-Coated Portions | | — | — | — | — | — |
| Peeling Evaluation | | A | C | C | C | A |
| Function Evaluation of Seed Layer | | C | — | — | — | C |
| Adhesion Force Evaluation of Metal Layer | | A | — | — | — | A |

As shown in Tables 1 through 4, the laminated bodies according to the invention showed desired effects.

From comparison between Example 5 and Examples 1 through 4, it was confirmed that the adhesion force of the metal layer was superior when the metal layer had a multilayer structure.

From comparison between Example 14 and Example 16, it was confirmed that peelability was superior when the metal-coated portions were present on the inner wall faces of the through holes.

<Production of Organic EL Display Device (Corresponding to Electronic Device)>

An organic EL display device was produced according to the following procedure using the substrate of the laminated body obtained in each of Examples 1 to 17.

First, films of silicon nitride, silicon oxide, and amorphous silicon were formed in the named order on a surface of the substrate of the laminated body on the opposite side to the supporting base material by plasma CVD. Next, low-concentration boron was implanted into the amorphous silicon layer by an ion doping device, and heat treatment and dehydrogenation treatment were performed thereon. Next, crystallization treatment of the amorphous silicon layer was performed by a laser annealing device. Next, low-concentration phosphorus was implanted into the amorphous silicon layer by etching using photolithography and the ion doping device to form N-type and P-type TFT areas.

Next, a film of silicon oxide was formed on the surface of the substrate of the laminated body on the opposite side to the supporting base material by plasma CVD, to form a gate insulating film. Then, a film of molybdenum was formed by sputtering and a gate electrode was formed by etching using photolithography. Next, high-concentration boron and high-concentration phosphorus were implanted into the desired N-type and P-type areas respectively by photolithography and the ion doping device to form a source area and a drain area.

Next, on the surface of the substrate of the laminated body on the opposite side to the supporting base material, a film of silicon oxide was formed by plasma CVD to form an interlayer insulating film, a film of aluminum was formed by sputtering, and a TFT electrode was formed by etching using photolithography. Next, after heat treatment and hydrogenation treatment were performed under a hydrogen atmosphere, a film of nitrogen silicon was formed by plasma CVD to form a passivation layer.

Next, an ultraviolet curable resin was applied onto the surface of the substrate of the laminated body on the opposite side to the supporting base material to form a planarization layer and contact holes by photolithography. Next, a film of indium tin oxide was formed by sputtering and a pixel electrode was formed by etching using photolithography. Successively, on the polyimide resin layer on the opposite side to a glass substrate, a film of 4,4',4"-tris(3-methylphenylphenylamino)triphenylamine, a film of bis[(N-naphthyl)-N-phenyl]benzidine, a film in which 40 vol % of 2,6-bis[4-[N-(4-methoxyphenyl)-N-phenyl]aminostyryl] naphthalene-1,5-dicarbonitrile (BSN-BCN) was mixed with 8-quinolinol aluminum complex (Alq3), and a film of Alq3 were formed by vapor deposition respectively as a hole injection layer, a hole transport layer, a light emission layer, and an electron transport layer in this order. Next, a film of aluminum was formed by sputtering and a counter electrode was formed by etching using photolithography.

Next, another glass plate was bonded and sealed on the surface of the substrate of the laminated body on the opposite side to the supporting base material through an ultraviolet curable type adhesive layer. An organic EL structure body was formed on the polyimide resin layer by the aforementioned procedure. A structural object (hereinafter referred to as Panel A) having the organic EL structure body on the substrate is a laminated body with an electronic-device member according to the invention.

Successively, the sealing body side of the Panel A was vacuum-adsorbed on a surface plate, and the panel A was then irradiated with a laser beam from the supporting base material side to perform peeling between the adhesive layer (silicone resin layer) and the metal layer. As a result, the supporting base material with the silicone resin layer could be peeled off.

Although the invention has been described in detail and with reference to specific embodiments, it is obvious to those skilled in the art that various changes or modifications can be made without departing from the spirit and scope of the invention. The present application is based on a Japanese patent application filed on Jun. 11, 2020 (Patent Application No. 2020-101638), the contents of which are hereby incorporated by reference.

REFERENCE SIGNS LIST 10A, 10B, 10C: laminated body
12: supporting base material
14: adhesive layer
16A, 16B, 16C: metal layer
18A, 18B, 18C: substrate
20: supporting base material with adhesive layer
22: first through hole
24: second through hole
26: metal-coated portion
28: electronic device member
30: laminated body with electronic device member
32: electronic device

The invention claimed is:

1. A laminated body, comprising:
a supporting base material;
an adhesive layer formed on the supporting base material and comprising a silicone resin layer;
a metal layer formed on the adhesive layer, comprising at least one metal selected from the group consisting of copper, titanium, palladium, gold, nickel, tungsten, and molybdenum, and having a first through hole;

a substrate positioned on the metal layer and having a second through hole such that the second through hole is communicating with the first through hole of the metal layer; and a metal-coated portion comprising a metal and covering at least a part of an inner wall face of the second through hole of the substrate, and wherein the substrate is a glass substrate.

2. The laminated body according to claim 1, wherein the metal layer comprises at least one metal selected from the group consisting of copper, titanium, palladium, gold, and nickel.

3. The laminated body according to claim 2, wherein the metal layer comprises a first metal layer and a second metal layer formed on the first metal layer such that a metal in the first metal layer is different from a metal in the second metal layer.

4. The laminated body according to claim 3, wherein the first metal layer is formed closer to the substrate than the second metal layer, and the first metal layer comprises titanium.

5. The laminated body according to claim 4, wherein the second metal layer comprises copper.

6. The laminated body according to claim 2, wherein the supporting base material is a glass substrate.

7. The laminated body according to claim 6, wherein the glass substrate includes an oxide-based glass having a silicon oxide content of 40 to 90 mass % in terms of an oxide amount.

8. The laminated body according to claim 2, wherein the silicone resin layer of the adhesive layer comprises a silicone resin formed from addition-reaction silicone or condensation-reaction silicone.

9. The laminated body according to claim 2, wherein the adhesive layer is in direct contact with the supporting base material and the metal layer respectively, and the metal layer is in direct contact with the adhesive layer and the substrate respectively.

10. The laminated body according to claim 1, wherein the metal layer comprises a first metal layer and a second metal layer formed on the first metal layer such that a metal in the first metal layer is different from a metal in the second metal layer.

11. The laminated body according to claim 10, wherein the first metal layer is formed closer to the substrate than the second metal layer, and the first metal layer comprises titanium.

12. The laminated body according to claim 11, wherein the second metal layer comprises copper.

13. The laminated body according to claim 10, wherein the adhesive layer is in direct contact with the supporting base material and the metal layer respectively, and the metal layer is in direct contact with the adhesive layer and the substrate respectively.

14. The laminated body according to claim 1, wherein the supporting base material is a glass substrate.

15. The laminated body according to claim 14, wherein the glass substrate includes an oxide-based glass having a silicon oxide content of 40 to 90 mass % in terms of an oxide amount.

16. An electronic device, comprising:

the laminated body of claim 1; and an electronic-device member positioned on the substrate in the laminated body.

17. The laminated body according to claim 1, wherein the silicone resin layer of the adhesive layer comprises a silicone resin formed from addition-reaction silicone or condensation-reaction silicone.

18. The laminated body according to claim 1, wherein the adhesive layer is in direct contact with the supporting base material and the metal layer respectively, and the metal layer is in direct contact with the adhesive layer and the substrate respectively.

19. A method for producing an electronic device, comprising:

forming an electronic-device member on a surface of the substrate of the laminated body of claim 1 to obtain a laminated body with an electronic-device member; and irradiating the laminated body with the electronic-device member with a laser beam from the supporting base material side to peel off the supporting base material and the adhesive layer from the laminated body with the electronic-device member to obtain the electronic device comprising the electronic-device member, the substrate, and the metal layer.

* * * * *